BEST AVAILABLE COPY

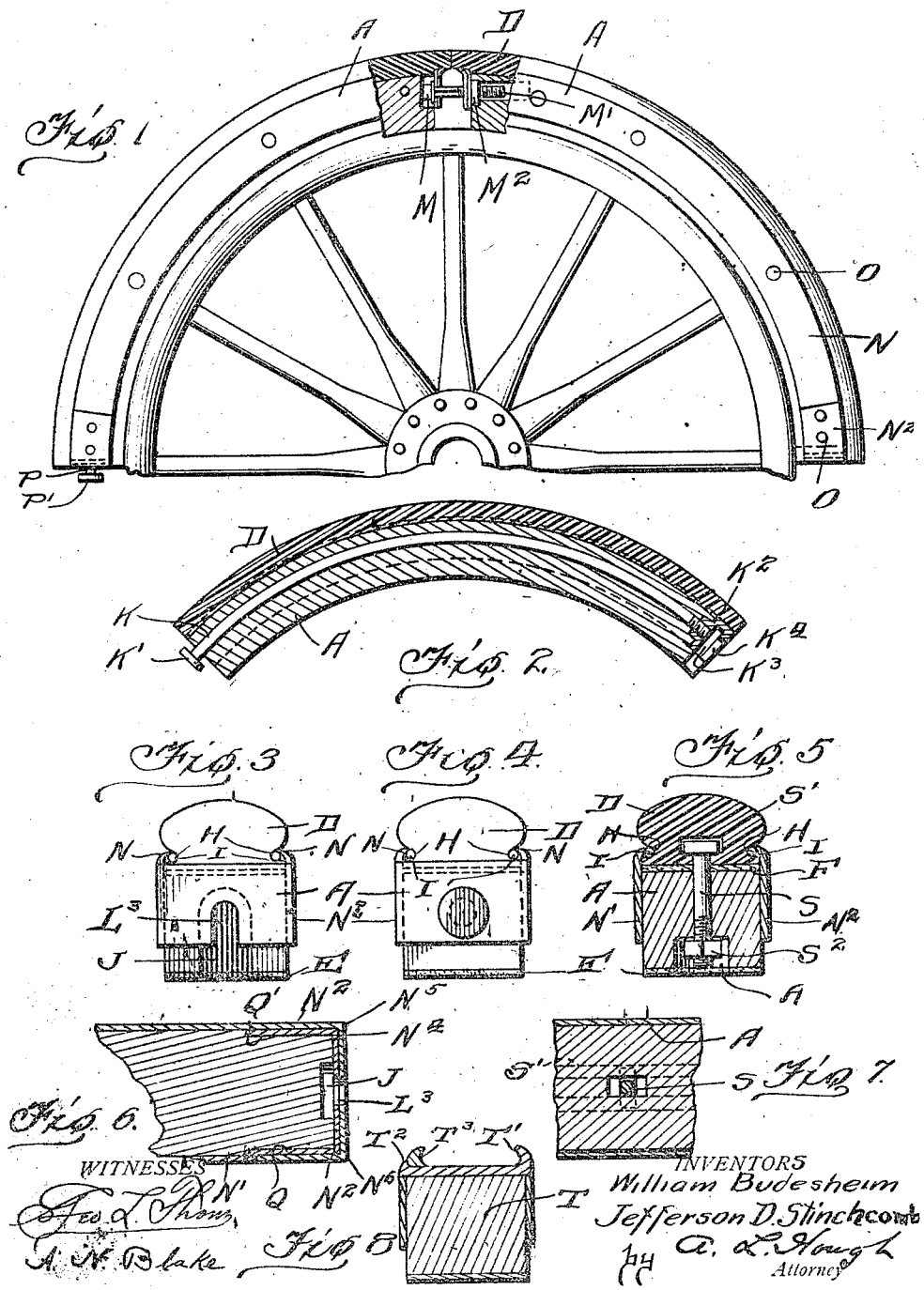

UNITED STATES PATENT OFFICE.

WILLIAM BUDESHEIM AND JEFFERSON D. STINCHCOMB, OF BALTIMORE, MARYLAND, ASSIGNORS TO WILLIAM F. BEASLEY, OF PLYMOUTH, NORTH CAROLINA.

EMERGENCY-TIRE FOR AUTOMOBILE-WHEELS, &c.

1,010,014.

Specification of Letters Patent. Patented Nov. 28, 1911.

Application filed December 7, 1910. Serial No. 596,079.

*To all whom it may concern:*

Be it known that we, WILLIAM BUDESHEIM and JEFFERSON D. STINCHCOMB, citizens of the United States, residing at Baltimore, State of Maryland, have invented certain new and useful Improvements in Emergency-Tires for Automobile-Wheels, &c.; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in sectional emergency tires adapted for quick and ready application to the rims of wheels in the event of pneumatic tires being punctured or otherwise injured.

In carrying out the present invention, it is our purpose to generally improve upon the construction of sectional tire covered by Letters Patent heretofore granted to us and bearing Numbers 947,221 and 975,325.

The present invention is illustrated in the accompanying drawings, in which:—

Figure 1 is an elevation of a portion of a wheel showing the application of our sectional tire thereto. Fig. 2 is a central longitudinal sectional view through a slightly modified form of the invention. Fig. 3 is an end view of one of the sections shown in Fig. 1 and illustrating a groove for the reception of a headed member of an adjacent section. Fig. 4 is a view in end elevation of one of the sections showing a headed lug for engagement with the slot shown in Fig. 3. Fig. 5 is a cross sectional view through a rim and tire showing a modified means of holding the tread surface to the section of the tire. Fig. 6 is a longitudinal sectional view through one end of the section. Fig. 7 is a sectional view showing the manner in which the modified holding device illustrated in Fig. 5 is adapted to engage the tread surface and hold the same to the section of the tire, and Fig. 8 is a modified form of clencher plate integral with the tire section and adapted to coöperate with a clamping member to hold the tread surface in position.

Reference now being had to the details of the drawings by letter, A, A designate sections of the emergency tire which are formed on the arcs of circles and are adapted to be clamped against the circumference of the rim B. Each section A, may be of any suitable material, such as wood, metal or other substance and upon which section the tread surface D is mounted. Interposed between the outer convexed surface of each section A and the tread surface D is a layer of fabric F. Said tread surfaces, may be of any suitable material, such as rubber, fiber or composition of any kind, and have a longitudinal curved groove H formed upon each side and in which the sections of the rods I are positioned, forming means adapted to be gripped by the inwardly turned curved edges N of the segment plates N' and N², thus forming a clencher connection. Said plates N' and N² are held to the tire sections A by means of bolts O or other means passing through registering apertures in the plates and section, thus affording a secure means for holding the tread surfaces in place. Upon reference to Fig. 6 of the drawings, it will be seen that the end of the plate N' is bent at right angles at N³ and also at N⁴ and is provided with an offset Q adapted to engage a recess formed in one face of the tire section to which it is fastened, while the end of the plate N' also seats in a recess Q' formed in the opposite face of the tire section. The plates N² adjacent to one end of the section to which it is fastened is bent at right angles at N⁵ and again at N⁶ and is adapted to fit over the bent portions of the plate N' in the manner shown. The two portions of the plates which are bent about the end of the tire section are provided with registering apertures L adapted for the reception of the shank portion of the bolt P having a head P', as shown clearly in Figs. 1 and 4 of the drawings and which headed bolt is adapted to be fastened to the opposite ends of the plates which are bent about the end of the section in the same manner as shown in Fig. 6. The end of the section about which the apertured ends of the plates N' and N² are bent is recessed away as at J for the reception of the head P' of the bolt.

In Fig. 2 of the drawings we have shown a slight modification of our invention in which a curved rod K passes longitudinally through the section and one end of the rod projects beyond one end of the section in which it is mounted and is provided with a rod K', while the opposite end is threaded and engages a threaded aperture in the socket member K² which is fastened to the tire section, said socket member being provided with a recess K³ and is slotted at K⁴ for the reception of the projecting headed end of a rod upon an adjacent section to be fastened to the rim of the wheel.

In order to afford an additional anchorage to the tread surface of the tire, T-bolts, one of which is designated in Fig. 5 of the drawings by letter S, are provided, the headed ends of which are adapted to be contracted in a slot S' formed on the inner concaved face of the tread surface, said T-shaped ends of the bolts being inserted with their heads running longitudinally of the slot and after which turned a partial revolution in order to bring the T-shaped ends thereof at right angles to the slot in the manner shown in Fig. 7 of the drawings. A nut S² is fitted upon the threaded end of the bolt S and is countersunk in a recess A' formed in the inner surface of the tire section. A suitable fabric E is interposed between the tread surface D and the section T and which is preferably of a soft material and serves as a cushion.

In Fig. 8 of the drawings we have shown a slightly modified form of the clencher apparatus in which the tire section T has an integral clencher hook portion T' along one of its marginal edges and the opposite edge has a rib T² against which a curved clamping member T³ is adapted to bear to coöperate with the hooked portion T' to securely clench and hold the tread surface of the tire section.

Referring to Fig. 1 of the drawings will be seen a means for drawing sections of the tire connected together by the mechanism before described so that the inner concaved surfaces of the tire sections will be clamped securely against the circumference of the rim and in which figure a bolt, designated by letter M, is provided which engages slots formed in the inwardly turned ends of the plates N' and N², while the threaded portion M' of the bolt passes through a nut M² held against the rear face of one of the inwardly turned ends of the tread surface engaging plates. The shank portion of the bolt M intermediate the section is preferably square or angular in cross section and affords means whereby a wrench may be employed for conveniently turning the bolt when it is desired to cause the adjacent ends of the sections to be drawn toward or moved away from each other.

By the provision of an emergency tire made up of sections as shown and described, it will be noted that a simple and efficient means is afforded whereby, in the event of a pneumatic tire being punctured or otherwise damaged, the same may be removed from the rim and the sectional tire easily and quickly adjusted to the rim as a substitute for the pneumatic tire.

What we claim to be new is:—

1. An emergency tire comprising tire sections, a tread surface upon each section, clencher plates fastened to the opposite faces of the sections, the ends of said plates being bent over the ends of said sections, a headed lug at the end of one section and a slot at its other end adapted to receive a headed lug of an adjacent section to hold the sections together, and means for drawing and holding the connected sections frictionally against the circumference of the rim of a wheel.

2. An emergency tire comprising tire sections, a tread surface upon each section, clencher plates fastened to the opposite faces of the sections, the longitudinal edges of said plates being bent over the ends of the sections, means engaged by said bent edges to hold the tread surfaces upon the sections of the tire, the ends of said plates being bent over the ends of said sections and overlapping each other, said overlapping ends being provided with registering slots opening into a recess in the adjacent end of the section, a headed lug fixed to a bent portion of a plate and the opposite end of said section and designed to engage the slots in the end of an adjacent section, and means for drawing and holding the connected sections frictionally against the circumference of the rim of a wheel.

3. An emergency tire comprising tire sections, a tread surface upon each section, clencher plates fastened to the opposite faces of the sections, means engaged by said plates and adapted to hold the tread surfaces against the convexed surfaces of said sections, means for fastening the ends of the sections together, a headed bolt engaging slots in adjacent ends of two of the sections, a nut upon the threaded portion of the bolt, said plates which are engaged by said bolt being spaced apart, the shank portion of said bolt being angular in cross section intermediate the pairs of plates.

In testimony whereof we hereunto affix our signatures in the presence of two witnesses.

WILLIAM BUDESHEIM.
JEFFERSON D. STINCHCOMB.

Witnesses:
A. L. HOUGH,
A. R. FOWLER.